(12) United States Patent
Gill

(10) Patent No.: US 8,474,880 B2
(45) Date of Patent: Jul. 2, 2013

(54) PIPE COUPLING INCLUDING ARCUATE SNAP COUPLERS

(76) Inventor: Ajit Singh Gill, Salt Lake City, UT (US)

(*) Notice: Subject to any disclaimer, the term of this patent is extended or adjusted under 35 U.S.C. 154(b) by 0 days.

(21) Appl. No.: 13/179,450

(22) Filed: Jul. 8, 2011

(65) Prior Publication Data

US 2012/0175875 A1    Jul. 12, 2012

Related U.S. Application Data

(60) Provisional application No. 61/399,303, filed on Jul. 10, 2010.

(51) Int. Cl.
*F16L 23/00*        (2006.01)
(52) U.S. Cl.
USPC .......................................... 285/368; 285/412
(58) Field of Classification Search
USPC ................. 285/110, 111, 113, 373, 368, 411, 285/412, 413, 414, 415
See application file for complete search history.

(56) References Cited

U.S. PATENT DOCUMENTS

| | | | | |
|---|---|---|---|---|
| 432,318 A | * | 7/1890 | Mathews et al. | 285/368 |
| 570,170 A | * | 10/1896 | Greenfield | 285/53 |
| 674,928 A | * | 5/1901 | Mauran | 285/412 |
| 787,791 A | * | 4/1905 | Reynolds | 285/368 |
| 940,098 A | * | 11/1909 | Wehrle | 285/372 |
| 1,819,086 A | * | 8/1931 | Friend | 285/13 |
| 2,146,218 A | * | 2/1939 | Kimmich et al. | 285/222.2 |
| 3,042,430 A | | 7/1962 | Guy | |
| 5,024,585 A | * | 6/1991 | Kralovec | 417/360 |
| 5,540,547 A | | 7/1996 | Cole | |
| 5,752,724 A | | 5/1998 | Bormioli | |
| 7,455,331 B2 | | 11/2008 | Gill | |
| 7,850,213 B2 | | 12/2010 | Gill | |
| 2006/0254030 A1 | | 11/2006 | Woltmann et al. | |
| 2008/0106096 A1 | | 5/2008 | Gill | |

OTHER PUBLICATIONS

PCT Application PCT/US2011/043457; filed Jul. 8, 2011; Ajit Singh Gill; International Search Report mailed Dec. 5, 2011.

* cited by examiner

*Primary Examiner* — Daniel P. Stodola
*Assistant Examiner* — James Linford
(74) *Attorney, Agent, or Firm* — Thorpe North & Western LLP

(57) ABSTRACT

Pipe ends having radial flanges may be easily attached by an arcuate snap coupler having a channel for receiving portions of spaced face to face flanges on respective pipe end portions to be connected. The flanges may be formed directly on the pipe end portions, or may be formed by coupler body pieces attached to the pipe end portions. The arcuate snap coupler includes an open channel portion having two parallel side walls spaced apart a distance equal to the maximum desired distance over the face to face flanges when the two pipe end portions are joined together, a first hinge portion for rotatable attachment to a first fastener bolt extending between the flanges, and a second hinge portion for attachment to a second fastener bolt extending between the flanges after rotation of the coupler to receive the flange portions in the channel.

16 Claims, 13 Drawing Sheets

PIPE COUPLING INCLUDING ARCUATE SNAP COUPLERS

PRIORITY CLAIM

Priority is claimed to U.S. Provisional Patent Application Ser. No. 61/399,303 filed Jul. 10, 2010, which is hereby incorporated herein by reference in its entirety.

BACKGROUND

1. Field

The invention is in the field of couplings to connect plain end and grooved end pipes, pipes having shoulders in their end portions, flanged pipe connections with bolts, and couplings to connect pipes with valves.

2. State of the Art

Inventor holds U.S. Pat. Nos. 7,455,331 and 7,850,213 which both show pipe coupling body pieces to be attached to the end portions of pipes to be connected and which form radial flanges or shoulders on the end portions of the pipes. The pipe ends are then connected together by couplers or covers which extend over the flanges or shoulders formed by the coupling body pieces and engage the flanges or shoulders on the coupling body pieces to hold the pipe ends together. A partitioner positioned between the ends of the pipes maintain separation between the pipe ends and between the flanges or shoulders. While these pipe couplings work well, an alternative coupler which provides a quick and easy connection between the flanges or shoulder can be advantageous in various situations.

SUMMARY OF INVENTION

According to the invention, a coupler, hereinafter referred to as an arcuate snap coupler, can be easily pivotally attached to a fastener extending between face to face radial flanges formed either directly on the pipe end portions or formed on the pipe end portions by coupling body pieces attached to the pipe ends. When the pipe ends are brought together so that the flanges are in face to face configuration, the arcuate snap coupler is rotated radially toward the pipe ends to capture portions of the face to face flanges in an arcuate snap coupler channel to thereby secure the pipe ends together.

In one example embodiment of the invention, an arcuate snap coupler includes two circular hinges at opposite ends of the coupler. One of the hinges is positioned between the face to face flanges to pivotally attach an end of the coupler to a fastener bolt which extends between the face to face flanges and through the hinge. The arcuate snap coupler is rotated about the hinged end to move the opposite end toward the pipe end portion to capture portions of the face to face flanges within an arcuate snap coupler channel and to position the circular hinge at the opposite end of the arcuate snap coupler between the face to face flanges. A second fastener bolt is then positioned between the face to face flanges and through the opposite circular hinge to lock the arcuate snap connector in position to hold the face to face flanges together to prevent axial separation of the pipe ends. The flanges are held in separated spaced condition by means of a partitioner. The partitioner can be provided with cross rods to increase the handling efficiency and ease of the partitioner. When the flanges are formed by coupling body pieces mounted on the pipe end portions, the inner geometry of the coupling body pieces and their attachment to the respective pipe end portions can be substantially the same as in the above cited inventor's U.S. Pat. No. 7,455,331. In such instance, the cylindrical wider end portion of each piece of the coupling body is provided with an integral flange with bolt holes or an individual flange is constructed as a ring with bolt holes. Said individual flange may be installed behind the integral mini flange, and welded to the mini flange or it is kept in rotatable and separable position. In another alternative, a plurality of integral casing tubes as bolt holes may be constructed with the flange. Casing tubes are provided when the coupling body has a thin wall and it is desired to cut the height of the flanges.

Each piece of the coupling body has a receiving opening end portion to receive the end portion of a pipe, and the geometry of the receiving end portion is of a vertical truncated cone and the opposite wider end has a cylindrical end portion. The two pieces of the coupling body can be pulled apart axially around the opposite end portions of pipes to be connected or the pipes that are connected. This allows easy connection or disconnection of the pipes and allows for easy replacement of gaskets in the coupler when necessary. Different types of inner means can be incorporated in each coupling body piece to accommodate different types of connections to different types of pipes. The coupling body is made of two pieces, where in most applications, each piece is preferably a mirror image of the other piece. Each piece houses inner means, which surrounds the end portion of the pipe to hold the pipe inside the coupling body. If the downstream pipe is of a different size or is made of different material than the upstream pipe, then the design and size of the down stream piece of coupling body is adjusted and modified. To prevent the pipes from slipping away from the coupling, the partitioner can be located centrally inside and between the two pieces of the coupling body and between the two ends of pipes being connected, thus allowing only limited movement of the pipes inside the coupling body. The arcuate snap coupler provides advantages in that individual arcuate snap couplers can be produced in practical small length, the height of the face to face flanges being connected can be reduced considerably, and the weight of the coupling also can be reduced.

THE DRAWINGS

The best mode presently contemplated for carrying out the invention is illustrated in the accompanying drawings, in which.

DETAILED DESCRIPTION OF THE ILLUSTRATED EMBODIMENT

The drawings are not drawn to any particular scale. Except for bolts, each side of coupling body holding inner means will be assumed to be a mirror image of the other. Numbers of right side elements corresponding with left side elements are assigned the same number but with an "A" appended thereto to show their correspondence. Thus, when left side element are being explained, the corresponding right side elements will be considered explained simultaneously too. Perspective views of parts are depicted for clarity of invention and drawings, therefore, only needed hidden lines are shown in drawings.

Figure 3:
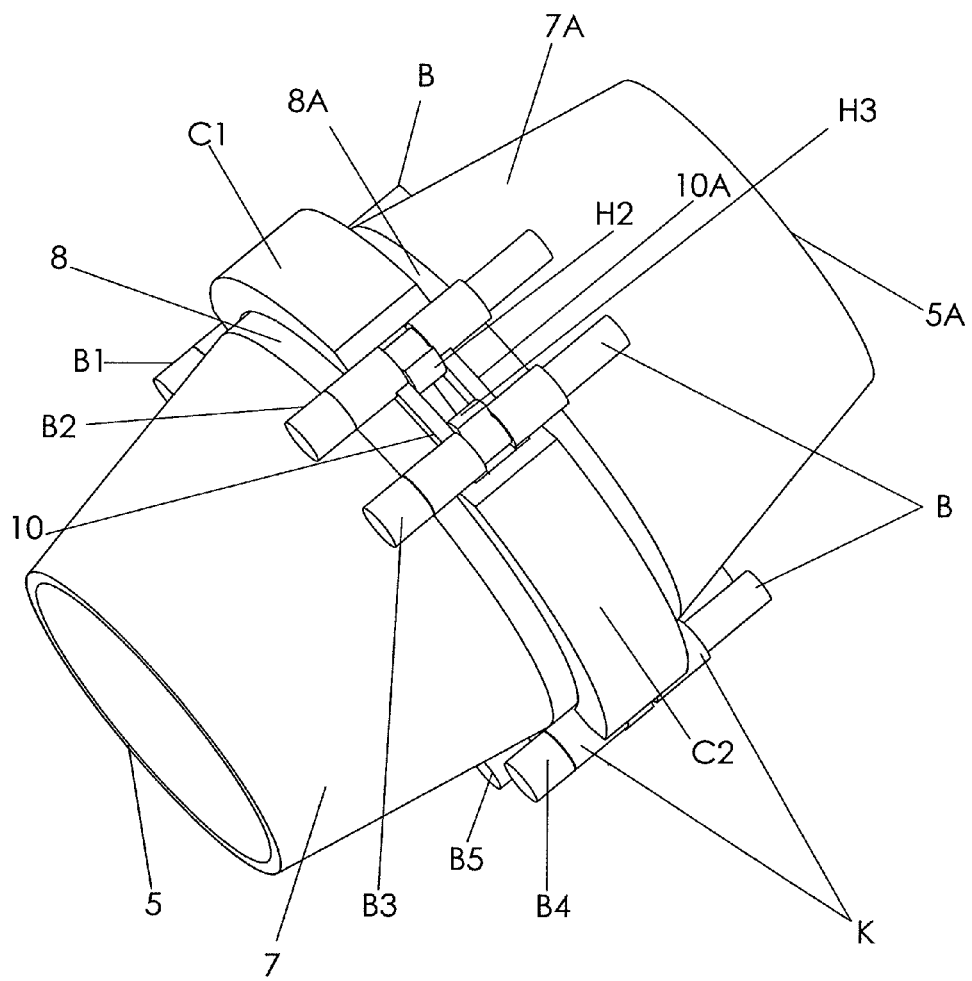
FIG. 3 is a perspective view of the of two piece coupling, where two pieces are held together by means three arcuate snap couplers.
Figure 4:
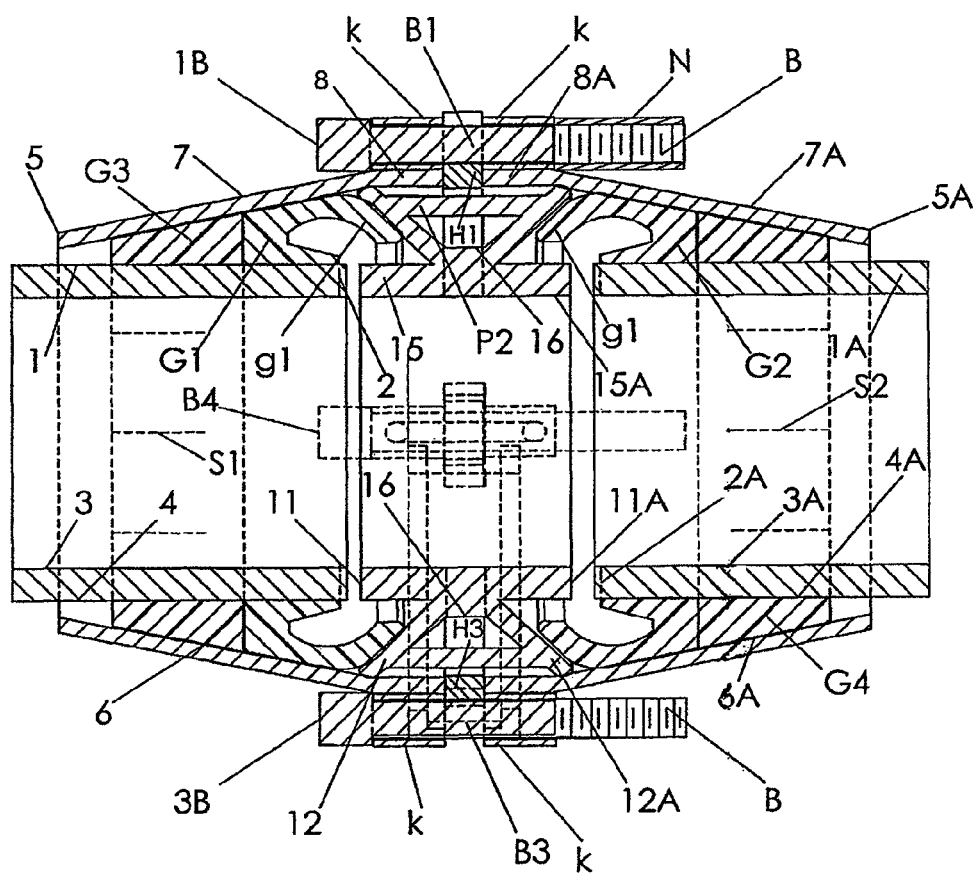
FIG. 4 is the transverse longitudinal vertical section (of FIG. 1) of the coupling body with two arcuate snap couplers depicting inner means mounted around the end portions of two pipes while holding two pipes in end-to end relationship.
Figure 8:
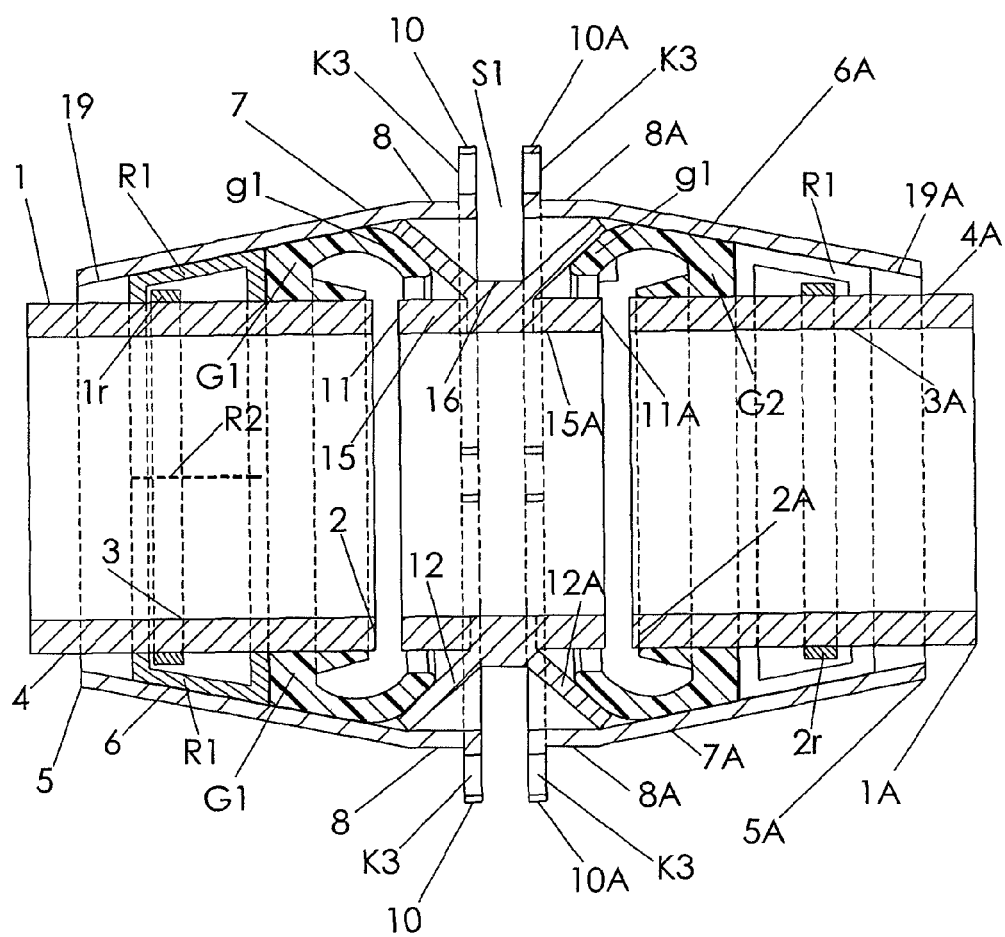
FIG. 8 is the longitudinal vertical section of the two piece coupling body, (where one piece of coupling body is shown in FIG. 7) and showing shoulders inside metallic backup rings (where shoulders constructed around pipes), and depicting two sealing gaskets, and showing partitioner at the center of the coupling body placed between end portions of two pipes.

Along with FIGS. 4 and 8 all other FIGS. can be studied simultaneously. It is pointed out here that except in FIG. 4 and FIG. 10, threads on bolt stems are not shown and nuts for said threaded stems are depicted only once by N in FIG. 4. From here on elastomeric plugs or hollowed metallic split rings (gripers) and metallic jaw means surrounding the end portions of two pipes and installed behind the sealing gasket means will be called backup rings or inner means. In FIGS. 3, 4, 8, 9 and 10, the ends of two pipes 1 and 1A are shown connected by means of the arcuate snap couplers, and inner and outer surfaces of said pipes are shown by 3, 3A and 4 and 4A, respectively. Different types of rings (plugs) and jaws are shown in the inventor's earlier above mentioned patents which can be used as the backup rings in the current invention too. FIG. 4 shows two elastomeric backup rings G3 and G4 backing sealing gaskets G1 and G2 which are similar to the rings of FIG. 10 of U.S. Pat. No. 7,455,331. Rings G3 and G4 are modifiable. The coupling body pieces have truncated narrow (conic) outermost ends, which are indicated by 5 and 5A, and inner cylindrical end portions are indicated by 8 and 8A.

Except in cases where two different sizes of pipes are being connected, or where said two pipes are made from different types of materials, the second piece of coupling is assumed as an exact mirror view of the first piece. Each said piece has a receiving opening therein so that the coupling body closely receives and surrounds the end portions of the pipes to be coupled. Inner means to surround and hold the pipe inside the coupling body, such as backup rings G3 and G4, are modifiable to meet various needs in the piping system.

The receiving opening in each piece of the coupling body has an inner end taper converging toward its outer end, and it provides an enclosure for inner means such as the described modifiable backup rings for sealing gasket mean, where the backup rings may be elastomeric plugs or hollowed metallic rings, and the sealing gasket means may seal axial as well as radial leakage of fluid from the coupling body. Said inner means hold the pipes securely inside the coupling body, and they are separated by means of partitioner P located at the center inside the coupling body so that leaking sealing gasket means can be removed and replaced with new sealing gasket means. Fluid pressure is brought to bear against the backup rings by means of the sealing gasket means with the agency of fluid pressure in the pipeline to establish a firm grip of the backup rings around the end portions of pipes. Axial and radial leakage is prevented by means of said two elastomeric sealing gaskets G1 and G2. The sealing gaskets G1 and G2 are modifiable, where section (leg) g1 may be an integral part of the sealing gasket or it may be a distinct separated part in the monolithic structure of the sealing gasket. And leg g1 may be given any length and shape to seal the fluid exit from the coupling body. The length of each piece of coupling body and number of casing tubes (bolt holes) and bolts depends on the size of the coupling corresponding to the size of the pipes, and material of pipe, and fluid pressure in the pipeline. The design of the inner means to surround the end portions of the pipes is dependent on the material of the each pipe and it's rating, and on whether the pipe is plain end or has a groove or shoulder in its end portion. The coupling can accommodate thermal expansion and contraction of pipes. Two pieces 7 and 7A of the coupling body and arcuate snap coupler C1 and partioner P can be manufactured with combinations of currently known conventional manufacturing methods.

Figure 5:
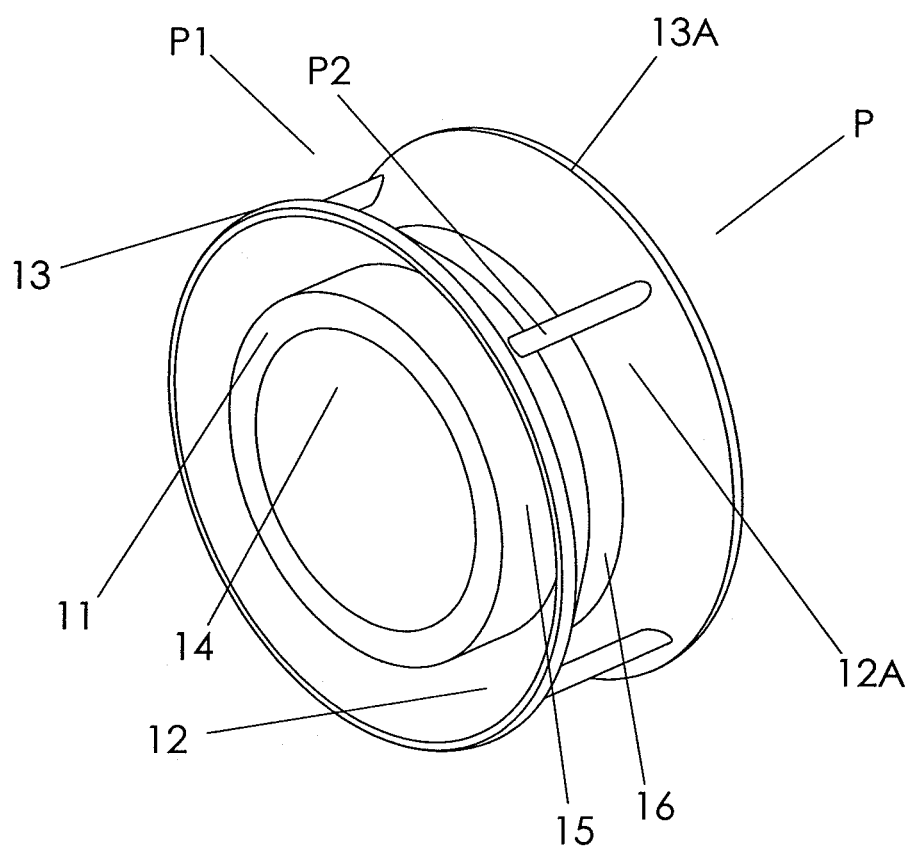
FIG. 5 is a perspective view of the open channel partitioner with cross rods.

Partitioner P shown in FIGS. 4, 5, 8 and 10 has a cylindrical inner portion divided into two sections 15 and 15A by base 16 of concentric open channel with slanting walls 12 and 12A. Cross rods P2 are provided to handle the partitioner P with ease and efficiently when two pieces 7 and 7A are assembled around end portions of pipes 1 and 1A. Walls 12 and 12A can be constructed integrally with cylindrical base 15 and 15A or they can be welded to cylindrical base 15 and 15A or two individual cylindrical opposite angled sections depicted by 15 and wall 12, and by 15A and wall 12A can be welded together. If in some way pipes 1 and 1A are restrained against movement, then the inner diameter of cylindrical base 15 and 15A of partitioner P is designed to slip around pipes 1 and 1A. It is also pointed out here that in some application, the cylindrical base of partitioner P shown by portions 15 and 16 may be eliminated altogether and slanting walls 12 and 12A are integrated into monolithic structure; yet in other alternative a special cylindrical ring of similar in cross section as rod P2 (as shown in FIG. 4) may be integrated inside of either cylindrical end portion 8 or 8A of the coupling body to bridge over legs g1 of gaskets G1 and G2 up to ends 13 and 13A of partitioner P as shown in FIG. 5 so that both ends of the special cylindrical ring are sealed against leakage of fluid. Further, as shown in FIG. 11, the partitioner P may be configured to surround the joined end portions of pipes 1 and 1A without any portion of the partitioner being between the pipe ends so that the partitioner can be slid, along with one of the coupler body pieces, along one of the pipe end portions during the connecting or disconnecting of the pipe ends.

From here on, the invented arcuate snap coupler will be understood as an individual single unit of an arcuate snap coupler, and as well as for a set of arcuate snap couplers, and including two opposite flanges of a coupling body or two opposite flanges of pipes are being connected by the coupler and the partitioner P. It is understood that the construction geometry of partitioner P may assume any shape to keep flanges 10 and 10A separated. Each coupling body piece has an outer end to receive the end portion of a pipe to be coupled and has a geometry of a vertical truncated cone. The inner end of each coupling body piece has a cylindrical portion and has a larger diameter than the outer receiving end. The cylindrical wider end portion of each coupling body piece is provided with an integral flange with bolt holes or an individual flange is constructed as a ring with bolt holes. An individual flange may be installed behind the integral mini flange, and welded to the mini flange or it is kept in rotatable and separable position. In another alternative, a plurality of integral casing tubes as bolt holes may be constructed with the flange. Casing tubes are provided when the coupling body has a thin wall and it is desired to cut the height of the flanges. From here on, casing tubes and bolts holes will be understood as synonymous.

Figure 1:
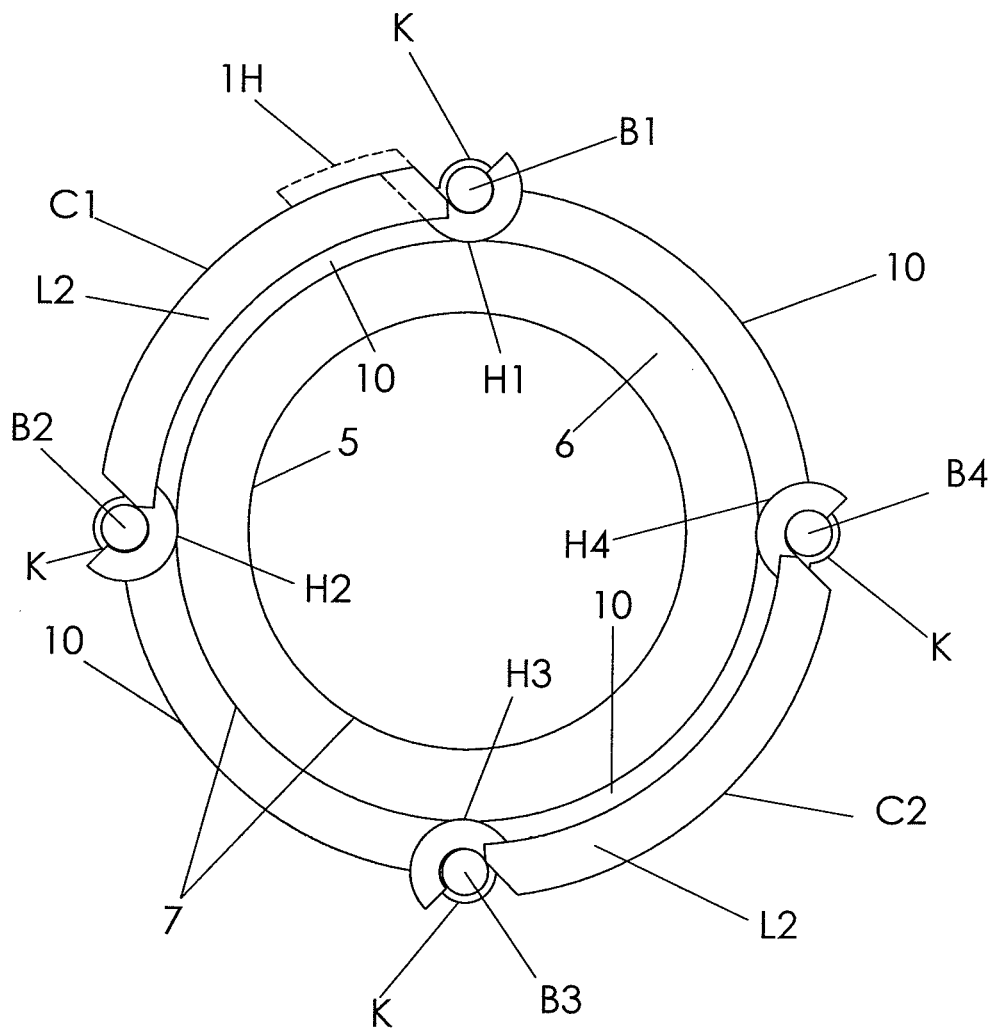
FIG. 1 is a view looking right at the larger end of one piece of coupling body depicting two arcuate snap couplers in their locking positions against the mini flange at the end of cylindrical portion of the piece.

Connecting pieces 7 and 7A of the coupling body to partitioner P will be explained first. First ends 2 and 2A of pipes 1 and 1A are moved closer to each other at a proper distance, then pieces 7 and 7A with ends 5 and 5A, respectively, are mounted with a slip fit around the end portions of pipes 1 and 1A. Slip fit prevents wiggling 7 and 7A around pipe 1 and pipe 1A respectively (diametrical gaps are exaggerated in FIGS. 4 and 8). Then backup rings G3, G4 or R1 and R2 for backing sealing gaskets G1 and G2 are mounted to surround pipes 1 and 1A, and then sealing gaskets G1 and G2 are located in their proper positions. Then 7 is pulled over G3 and G1, and end 13 of partitioner P (end 13 shown in FIG. 5) is mounted inside of cylindrical portion 8. Thereafter, 7A is pulled over end 13A of partitioner P, and then half of the bolts (shown with letters B) are mounted through half of the preferably equally spaced opposite bolt holes K in flanges around cylindrical portions 8 and 8A of pieces 7 and 7A of coupling body. Once half of the bolts are passed through said equally spaced bolt holes K then, nuts (not shown) are mounted around the threaded end portions of said bolts and nuts are tighten to put partitioner P in its proper position inside cylindrical portions 8 and 8A of the coupling body, and between two ends 2 and 2A of pipes 1 and 1A. Then each arcuate snap coupler with two partial circular hinges H1 and H2 at their opposite ends are snaped around said opposite flanges, (where first one hinge of each arcuate snap coupler is rotatably mounted around its corresponding bolt stem before the coupler is snaped in its place), and then the other remaining half of the bolts are installed through their corresponding hinges to interlock both ends of arcuate snap couplers with opposite flanges. Two hinges may be made integral parts of each arcuate snap coupler or each hinge individually is welded with the coupler or both hinges are made integral parts of arcuate piece C1, which piece bridges concentrically over the arcuate snap coupler and is held to the body of the coupler by welding or by any other suitable means such as a screw or a bolt. Bridge is situated external to the coupler along its entire length or partially its opposite portions with hinges can be situated inside the corresponding opposite ends of the coupler as shown in FIG. 1B. It is pointed out here that one of the hinges in a set of two hinges per arcuate snap coupler can be a hinge of complete circle as shown for hinges H5 and H6 in FIG. 1B, and in some situations can be used to mount the arcuate snap coupler or couplers along with the first set of bolts which include only half of the total number of bolts.

Figure 1A:
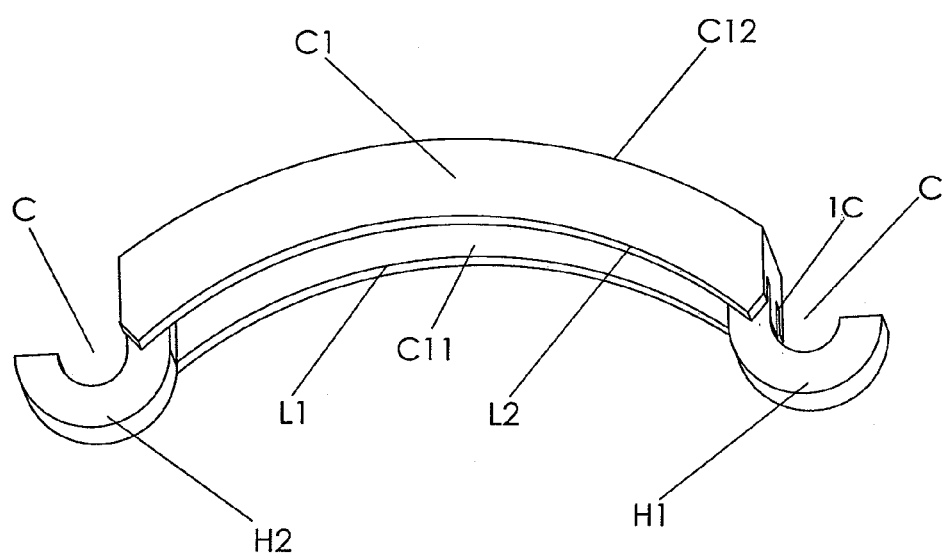
FIG. 1A is a perspective view of the of arcuate snap coupler.
Figure 1B:
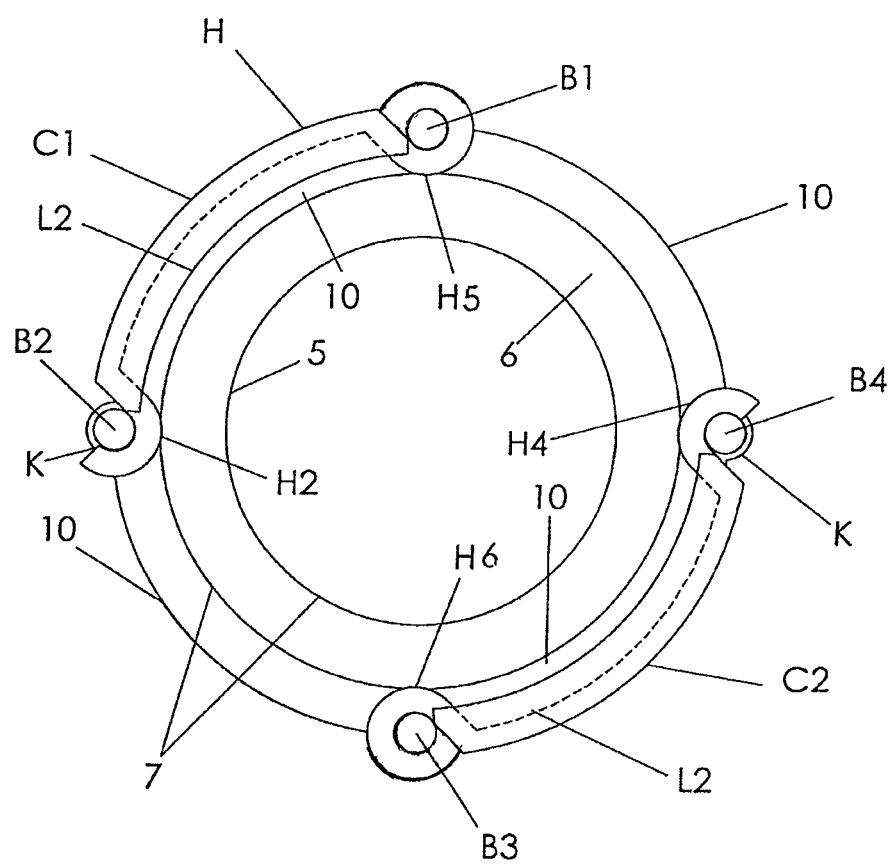
FIG. 1B shows an alternate design of arcuate snap coupler which is provided with bridge having integral hinges on its two ends, and showing full circular hinges on one end of each arcuate snap coupler.

Basic arcuate snap coupler C1 is shown in FIG. 1A and it is provided with two integral circular hinges H1 and H2. The coupler has two parallel side walls L1 and L2, FIG. 1A, and the open channel concentric with flanges 10 and 10A and concentric to partitioner P installed inside of cylindrical portions 8 and 8A of two pieces 7 and 7A of the coupling body shown in FIGS. 5 and 8, where P is depicted by base 15, 15A and side walls 12 and 12A. Centers of hinges H1 and H2 are indicated by C. The circular hinges H1 and H2 are centered between the parallel side walls L1 and L2, and side gaps depicted by 1C in FIG. 1A are provided for the mounting of hinges H1 and H2 around bolts B1, B2, B3 and B4, which hinges and bolts are shown in FIG. 1. Side gaps 1C, FIG. 1A, are provided between hinges H1 and H2 and walls L1 and L2 repectively. Hinges H1 and H2 do not touch walls L1 and L2 of the coupler to provide sufficient gaps for the walls L1 and L2 to be mounted around flanges 10 and 10A of the coupling body. Thus, the two parallel side walls L1 and L2 are spaced apart a distance equal to the distance over the face to face flanges when the two coupling body pieces are joined together. This allows portions of both of the face to face flanges to be simultaneously received in the channel C11, which prevents lateral separation of the flanges beyond the width of the channel C11. Alternate designs of hinges incorporated with the arcuate body of the coupler are shown in FIG. 1 and FIG. 1B. For alternate design of the arcuate snap coupler each hinge may be welded externally as shown by broken lines at 1H or welded internally as shown by hinges H2, H3 and H4 in FIG. 1; and weld is not shown. Another alternate design of incorporating hinges H1 and H2 with the arcuate channel of the coupler is shown in FIG. 1B, where both hinges are made integral parts of the arcuate piece, which arcuate piece bridges concentrically over the arcuate snap coupler and is held to the body of the coupler by welding or by any other suitable means such as a screw or a bolt. The bridge can be situated external to the coupler along its entire length or partially its opposite portions with hinges can be situated inside the corresponding opposite ends of the arcuate snap coupler. It is understood that instead of hinges constructed as a partial circle, circular hinges H5 and H6 may be constructed with geometry of a complete circle.

Figure 6:
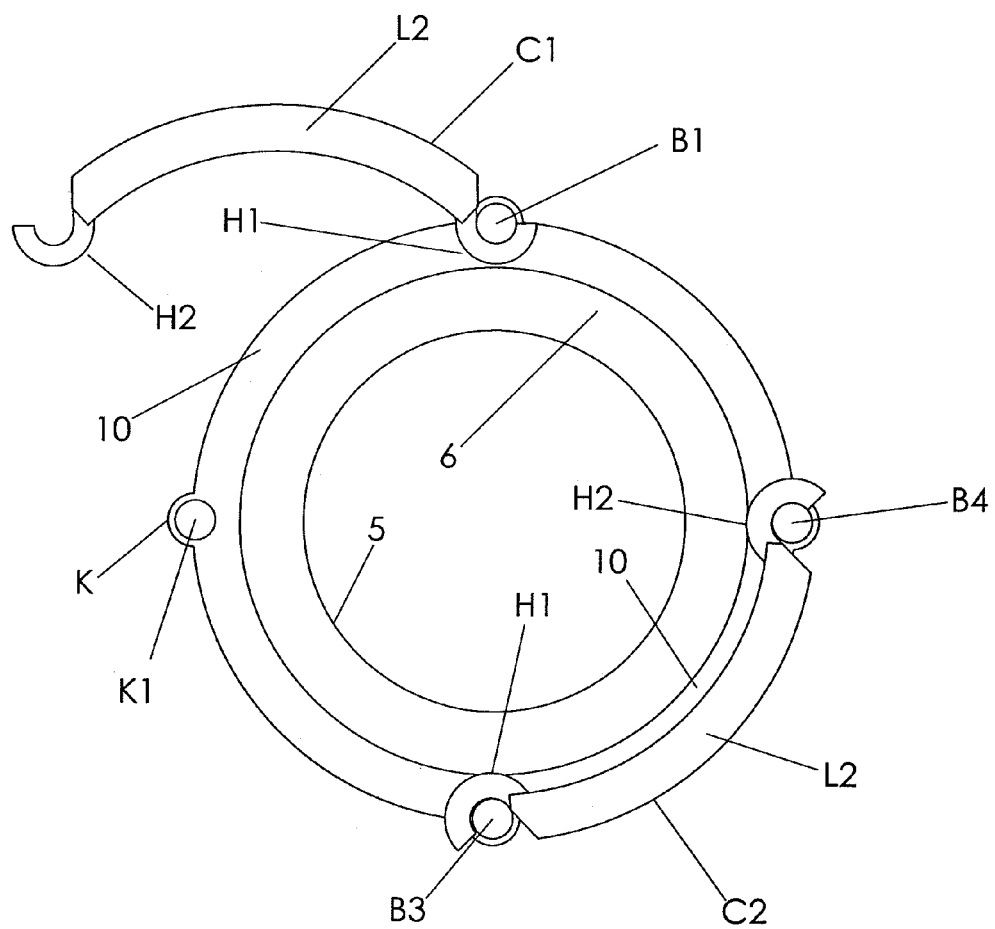
FIG. 6 is the same as FIG. 1, shows concept only (with relative diametrical sizes of flanges and two ends of one piece coupling body), and where one arcuate snap coupler is in process of being mounted around the opposite flanges of the two pieces of the coupling body, and other piece already has been locked in position.

Now with the aid of FIGS. 6, 4 and 8, the concept of the invention is explained, and it will be shown, how each arcuate snap coupler is mounted around flanges 10 and 10A, FIGS. 3 and 8, of pieces 7 and 7A of the coupling body. After positioning backup rings G3 and G4 and sealing gaskets G1 and G2 around end portions 2 and 2A of pipes and by positioning partitioner P inside of cylindrical sections 8 and 8A of pieces 7 and 7A of the coupling body and creating space (gap) Si shown in FIG. 8, half of the fastener bolts B1 and B3 are mounted through the opposite mirrored matching bolt holes K of flanges 10 and 10A and are held in their places by means of nuts. Then, arcuate snap coupler C1 is positioned as shown in FIG. 6, and hinge H1 of C1 is placed around bolt B1 and coupler C1 is rotated around bolt B1 in a manner that simultaneously wall L1 is mounted around flange 10 and wall L2 is mounted around flange 10A. When hinge H2 is coincided with the opposite openings K1 (bolt hole) of casing tube K, then bolt B2 is mounted through opposite opening K1 (bolt hole) of casing tube K and is bolted with nut N, where one representative nut N is shown in FIG. 4. The same process is used in case of coupler C2 to mount it around flanges 10 and 10A. In case of an arcuate snap coupler having hinges with geometry of a complete circle, one hinge of the coupler is mounted between the opposite two flanges while a first set (which include half of the bolts) of bolts are being installed through said flanges, and the arcuate coupler is kept free from the flanges till it is rotated and is locked against said opposite flanges.

Figure 2:
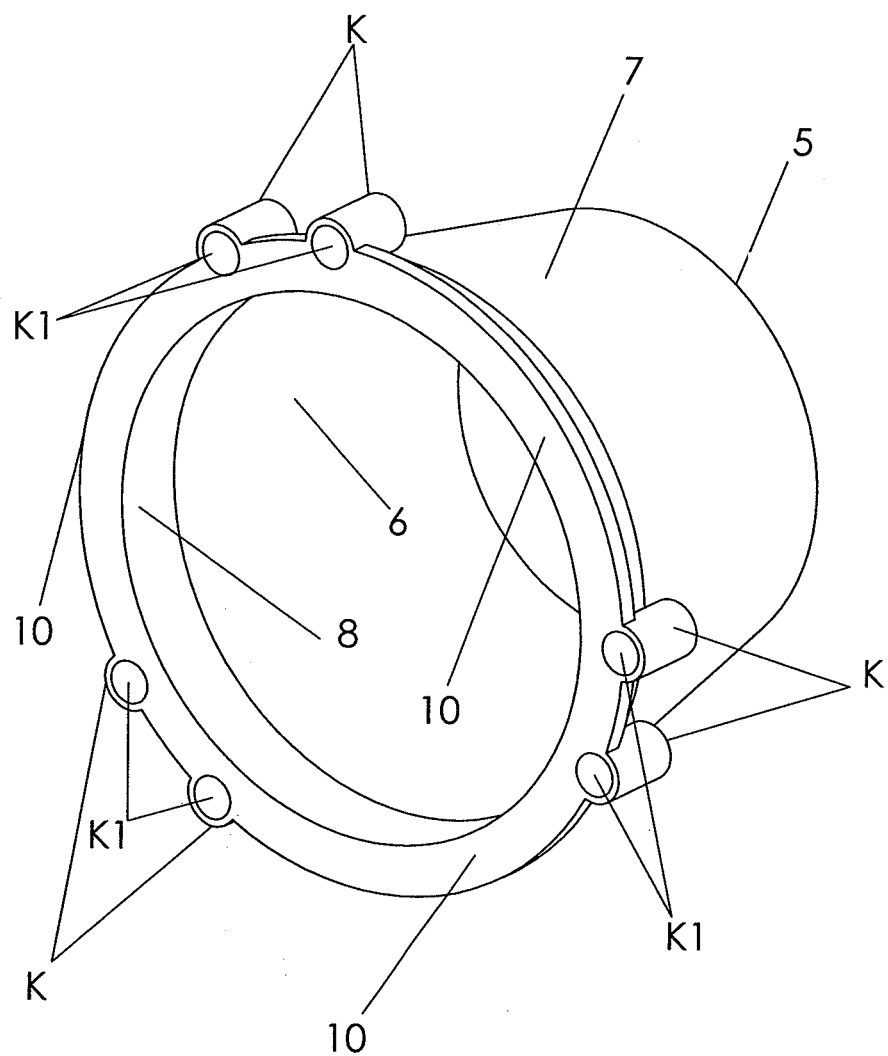
FIG. 2 is a perspective view of one piece of two piece coupling body showing plurality of tube casings (bolt holes) equally spaced around the wider end portion of said piece for three arcuate snap couplers.

It is clear by now that for each arcuate snap coupler two bolts are required. Number of arcuate snap couplers will depend on the size of the coupling. FIGS. 2 and 3 show how tube casings are arranged around the cylindrical portions 8 and 8A of pieces 7 and 7A of the coupling body. In FIG. 3 five bolts from B1 to B5 are apparent for couplers C1 and C2. Theaded ends B are not shown, threads are shown in FIG. 4 and FIG. 10.

Figure 7:
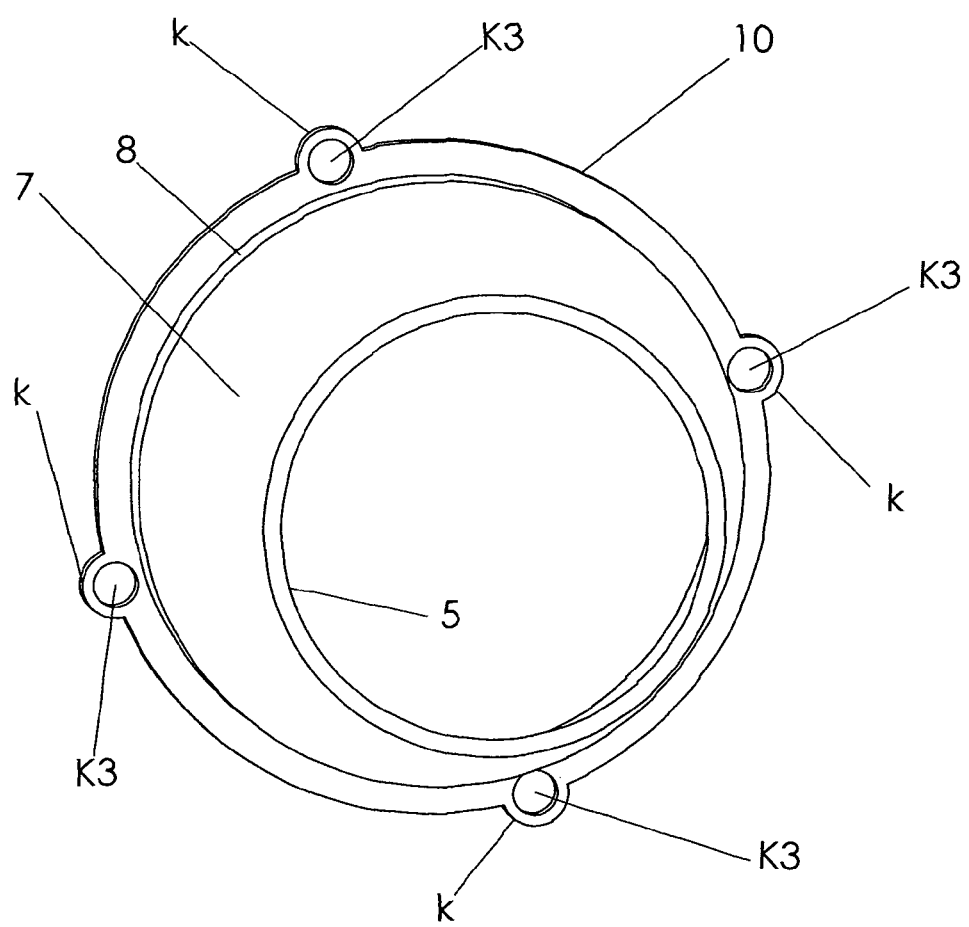
FIG. 7 is a perspective rear view of one piece with flange and bolt holes.

FIG. 7 shows perspective rear view of piece 7 with flange 10, where flange 10 is provided with alternate design of integral bolt holes K3 which is shown also in FIG. 8. In FIG. 8 backup split rings R1 with split R2 are shown. Rings R1 and R2 are mounted around shoulders 1r and 2r, which shoulders are welded to pipes 1 and 1A repectively. Shoulders also can be constructed by installing shoulder rings like 1r and 2r into corresponding grooves constructed around the pipes. The rest of the FIG. 8 was discussed along previous discussion.

Figure 9:
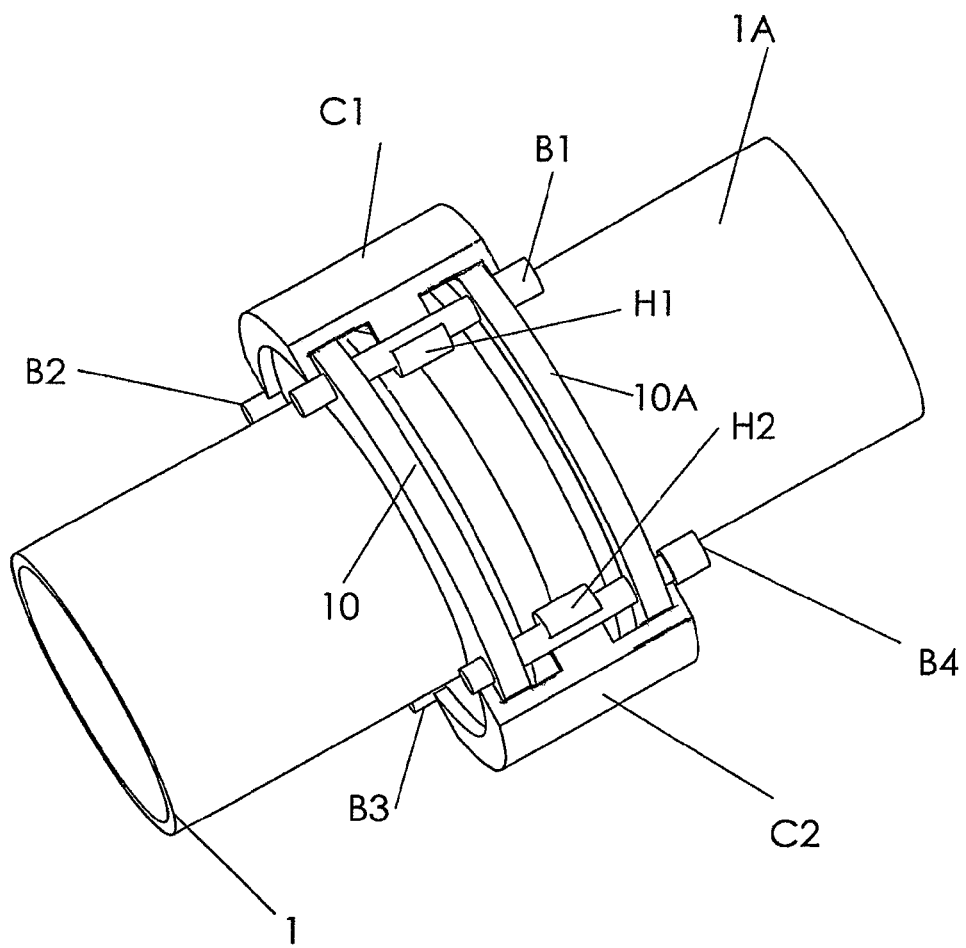
FIG. 9 is a perspective view of two arcuate snap couplers connecting opposite flanges of two pipes.
Figure 10:
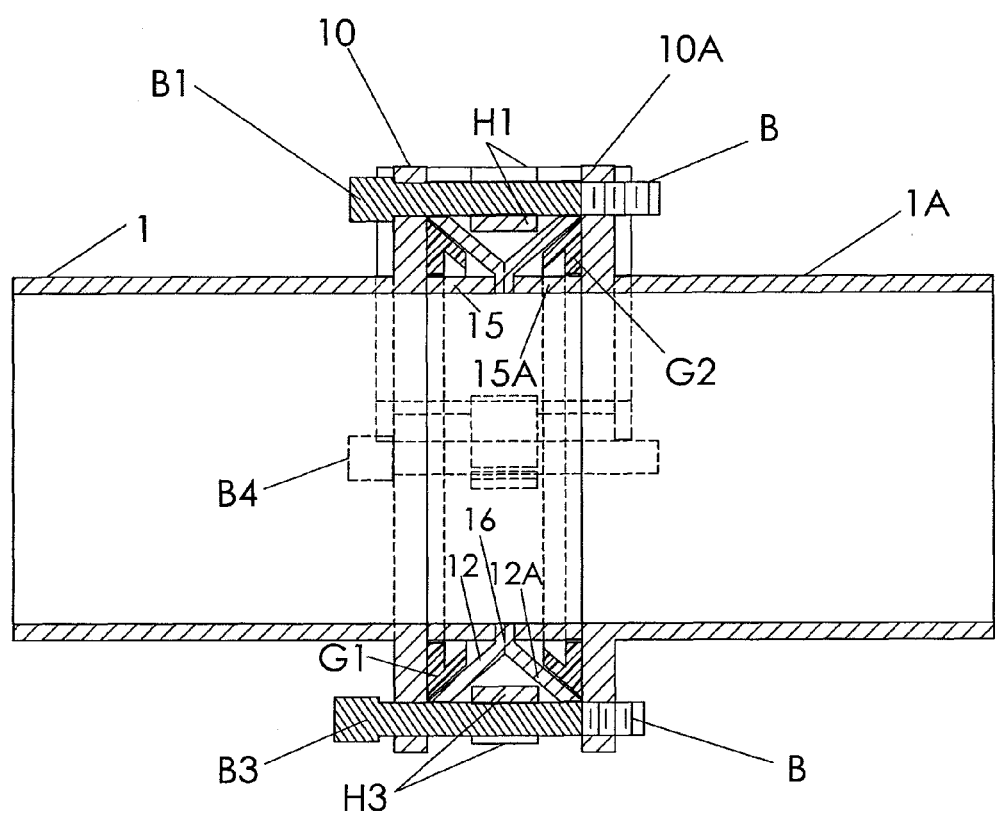
FIG. 10 is the longitudinal vertical section of two arcuate snap couplers connecting opposite flanges of two pipes, also depicting partitioner with two gaskets.
Figure 11:
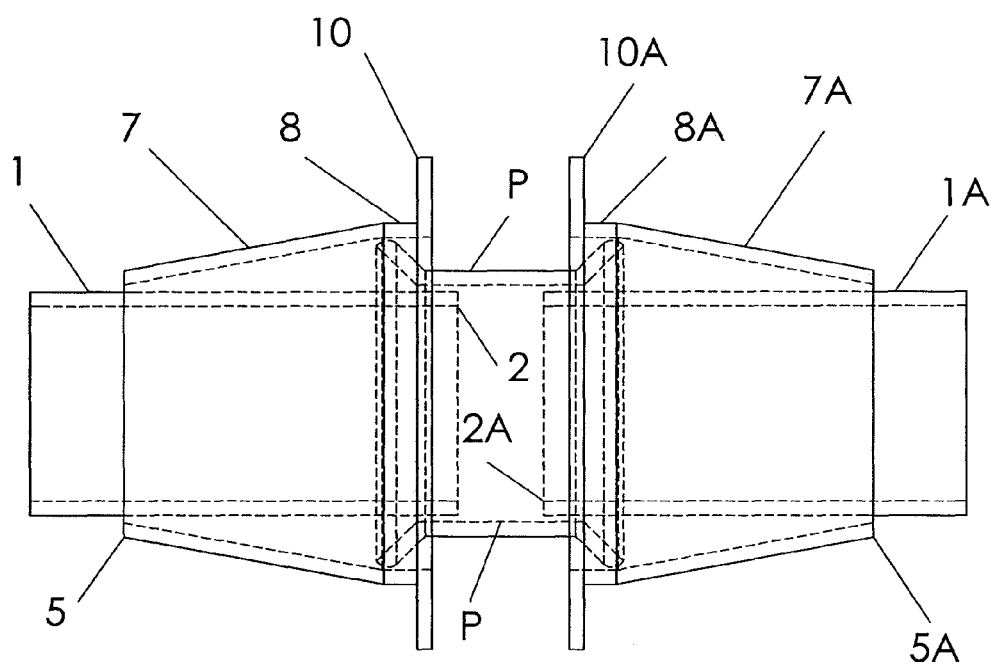
FIG. 11 is a side view of an alternate embodiment of a partitioner.

FIGS. 9 and 10 shows flanges 10 and 10A installed at the ends of of pipes 1 and 1A, and are connect by means of two arcuate snap couplers C1 and C2 and integral circular hinges are depicted by H1 and H2, and fastener bolts are shown by B1, B2, B3 and B4 in FIG. 9 and threaded end portions of stems of bolts B1 and B3 are shown by B in FIG. 10, where nuts are not shown. It is understood that the number and length of arcuate snap couplers will depend on the size of pipes. Preferably a partitioner P is shown by its two slanting walls 12 and 12A and cylindrical base divided into sections 15 and 15A. Preferably cylindrical portion shown by 15 and 15A is taken from the same size pipes as pipe 1 and pipe 1A. Sealing gaskets G1 between flange 10 and partitioner wall 12 and sealing gasket G2 between flanges 10A and partitioner wall 12A block leakage of fluid from the pipes. It is understood that various modifications of sealing gaskets G1 and G2 are possible. It is also understood that various means can be incorporated to insulate any elements of the coupling body including partitioner P against electrolysis.

Whereas the invention has been described with respect to the presently preferred illustrated embodiments, it should be understood that various changes may be made in adapting the invention to different embodiments without departing from the broader inventive concept disclosed herein and comprehended by the claims that follow.

I claim:

1. A coupler for coupling together the end portions of two pipes, comprising:
    a two piece coupling body, each piece having an inner end, an outer end, a radial flange extending radially outwardly around at least a circumferential portion of the inner end, a plurality of fastener bolt holes in the radial flange, and a receiving opening to receive and surround the end portion of one of the pipes to be coupled;
    each piece of the coupling body having therein an inner means for surrounding and holding the end portion of the pipe extending through the receiving opening inside the coupling body piece;
    a plurality of fastener bolts, each fastener bolt adapted to extend between one of the plurality of fastener bolt holes in one coupling body piece and one of the plurality of fastener bolt holes in the other coupling body piece to connect the two coupling body pieces together with the radial flanges in face to face mirrored matching positions;
    a partitioner adapted to be positioned between the coupling body pieces to hold the flanges in separated, spaced apart condition when the coupling body pieces are connected by the fastener bolts; and
    at least one arcuate snap coupler adapted to have an end thereof rotatably coupled to one of the fastener bolts and to extend to and be coupled to a second of the fastener bolts to join the two pieces of the coupling body together in spaced relationship, each arcuate snap coupler comprising:
        an open channel portion having two parallel side walls spaced apart a distance equal to the distance over the face to face flanges when the two coupling body pieces are joined together,
        a first hinge portion centered between the two parallel side walls and extending from the end of the arcuate snap coupler inwardly toward the partitioner for rotatable attachment of an end of the arcuate snap coupler to a first fastener bolt extending between the flanges, and
        a second hinge portion centered between the two parallel side walls and extending from a second end of the arcuate snap coupler inwardly toward the partitioner for attachment to a second fastener bolt extending between the flanges when the arcuate snap coupler is rotated about the first fastener bolt so that portions of the face to face flanges are received within the channel portion to thereby lock the arcuate snap coupler into position with the face to face flange portions received within the channel.

2. A coupler for coupling together the end portions of two pipes according to claim 1, wherein each coupling body piece has an inner taper tapering toward the outer end and providing an enclosure for the inner means to surround and to hold end portions of pipe inside the coupling body.

3. A coupler for coupling together the end portions of two pipes according to claim 1, wherein the inner means for surrounding and holding end portions of pipe inside the coupling body include a backup ring to backup sealing gasket means for blocking leakage from the coupling body.

4. A coupler for coupling together the end portions of two pipes according to claim 3, wherein the sealing gasket means for blocking leakage from the coupling body is situated between the partitioner and the backup ring.

5. A coupler for coupling together the end portions of two pipes according to claim 1, wherein the first hinge portion and the second hinge portion of the at least one arcuate snap coupler fit between the face to face flanges.

6. A coupler for coupling together the end portions of two pipes according to claim 5, wherein the arcuate snap coupler has opposite ends, and wherein the first hinge portion forms one end of the arcuate snap coupler and the second hinge portion forms the opposite end of the arcuate snap coupler.

7. A coupler for coupling together the end portions of two pipes according to claim 6, wherein the two parallel side walls of the open channel portion of the arcuate snap coupler are joined by a channel web, and the first and second hinge portions extend from ends of the channel web.

8. A coupler for coupling together the end portions of two pipes according to claim 7, wherein the first hinge portion includes a partial circular hinge.

9. An arcuate snap coupler for coupling together the end portions of two pieces of pipe, wherein each pipe end portion has a radial flange extending radially outwardly around at least a circumferential portion of the end portion of the pipe, and the radial flanges are held together face to face by means of fastener bolts extending between said flanges and the flanges are kept separated by means of a partitioner, the arcuate snap coupler comprising:
    an open channel portion having two parallel side walls spaced apart a distance corresponding to the distance over the face to face flanges for sitting over the face to face flanges when the two pipe end portions are joined together;

a first hinge portion centered and positioned between but not in abutment with the two parallel side walls for rotatable attachment of an end of the arcuate snap coupler to a first fastener bolt extending between the flanges;

a second hinge portion centered and positioned between but not in abutment with the two parallel side walls for attachment to a second fastener bolt extending between the flanges when the arcuate snap coupler is rotated about the first fastener bolt so that portions of the face to face flanges are received within the channel portion to thereby lock the arcuate snap coupler into position with the face to face flange portions received within the channel;

wherein the arcuate snap coupler has opposite ends, and wherein the first hinge portion forms one end of the arcuate snap coupler and the second hinge portion forms the opposite end of the arcuate snap coupler; and wherein the two parallel side walls of the open channel portion of the arcuate snap coupler are joined by a channel web, and the first and second hinge portions extend from ends of the channel web in a direction generally inwardly from the channel web.

10. An arcuate snap coupler for coupling together the end portions of two pieces of pipe according to claim 9, wherein the first hinge portion and the second hinge portion of the at least one arcuate snap coupler are capable of fitting between the face to face flanges.

11. An arcuate snap coupler for coupling together the end portions of two pieces of pipe according to claim 9, wherein the first hinge portion includes a partial circular hinge.

12. An arcuate snap coupler for coupling together the end portions of two pieces of pipe according to claim 9, wherein the first hinge portion and the second hinge portion include partial circular hinges.

13. An arcuate snap coupler for coupling together the end portions of two pieces of pipe according to claim 9, wherein the first hinge portion includes a circular hinge.

14. A coupler for coupling together the end portions of two pipes, comprising:

a radial flange formed directly on and extending radially outwardly around at least a circumferential portion of the end portion of each of two pipe ends to be connected and having a plurality of fastener bolt holes in the radial flanges;

a plurality of fastener bolts, each fastener bolt adapted to extend between one of the plurality of fastener bolt holes in one radial flange and one of the plurality of fastener bolt holes in the other radial flange to connect the two radial flanges together in face to face mirrored matching positions;

a partitioner adapted to be positioned between the face to face flanges to hold the flanges in separated, spaced apart condition when the flanges are connected by the fastener bolts; and at least one arcuate snap coupler adapted to have an end thereof rotatably coupled to one of the fastener bolts and to extend to and be coupled to a second of the fastener bolts to join the two flanges together in spaced, face to face relationship, each arcuate snap coupler comprising:

an open channel portion having two parallel side walls spaced apart a distance corresponding to the distance over the face to face flanges for sitting over the face to face flanges when the two pipe ends are joined together, a first hinge portion centered and positioned between but not in abutment with the two parallel side walls for rotatable attachment of an end of the arcuate snap coupler to a first fastener bolt extending between the flanges, a second hinge portion centered and positioned between but not in abutment with the two parallel side walls for attachment to a second fastener bolt extending between the flanges when the arcuate snap coupler is rotated about the first fastener bolt so that portions of the face to face flanges are received within the channel portion to thereby lock the arcuate snap coupler into position with the face to face flange portions received within the channel, wherein the arcuate snap coupler has opposite ends, and wherein the first hinge portion forms one end of the arcuate snap coupler and the second hinge portion forms the opposite end of the arcuate snap coupler, and wherein the two parallel side walls of the open channel portion of the arcuate snap coupler are joined by a channel web, and the first and second hinge portions extend from ends of the channel web in a direction generally inwardly from the channel web.

15. A coupler for coupling together the end portions of two pipes according to claim 14, additionally including sealing gasket means for blocking leakage from between the flanges.

16. A coupler for coupling together the end portions of two pipes according to claim 15, wherein the sealing gasket means for blocking leakage from between the flanges includes at least one sealing gasket means situated between each of the two flanges and the partitioner.

* * * * *